No. 785,756. PATENTED MAR. 28, 1905.
S. N. NUTZ.
ADJUSTABLE MEASURING AND RULING DEVICE
APPLICATION FILED NOV. 1, 1904.
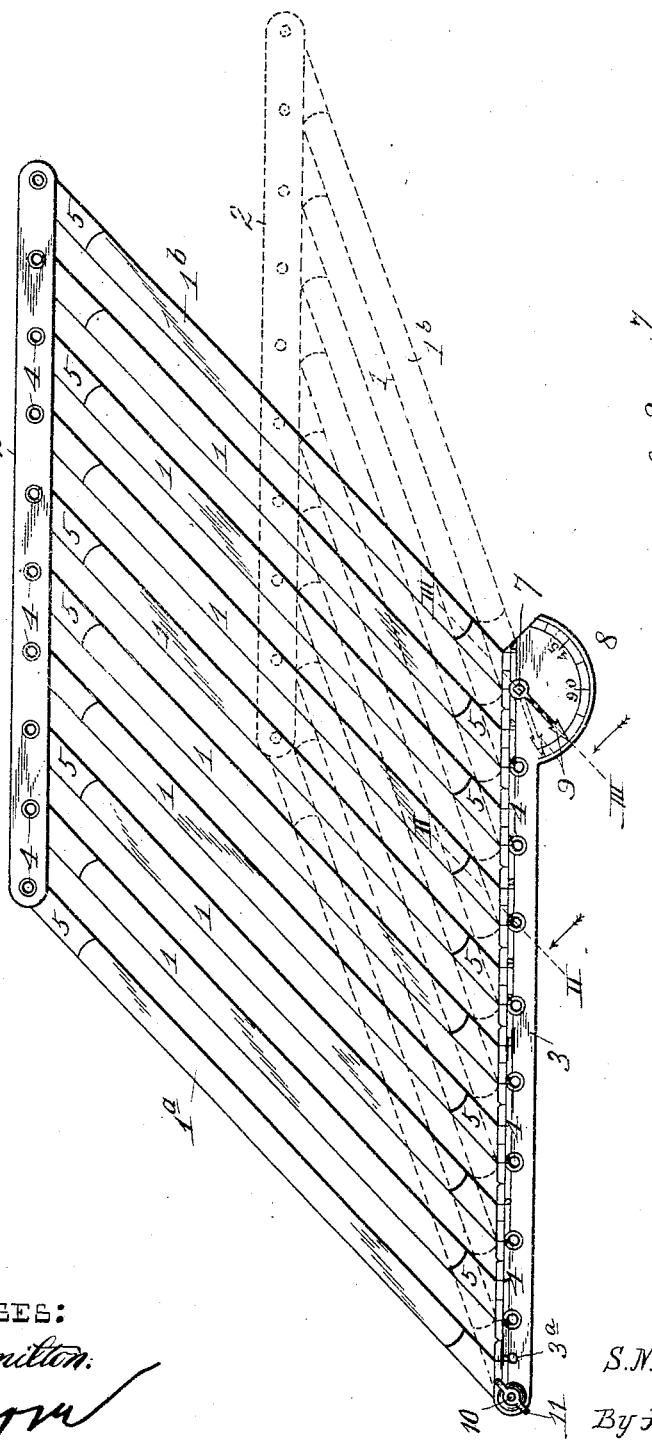
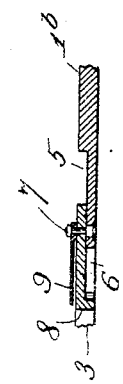
WITNESSES:
R. E. Hamilton
J. Morris
INVENTOR:
S. N. Nutz
By F. G. Fischer
atty.

No. 785,756.                                              Patented March 28, 1905.

UNITED STATES PATENT OFFICE.

SUSANNA N. NUTZ, OF KANSAS CITY, MISSOURI.

ADJUSTABLE MEASURING AND RULING DEVICE.

SPECIFICATION forming part of Letters Patent No. 785,756, dated March 28, 1905.

Application filed November 1, 1904. Serial No. 230,936.

*To all whom it may concern:*

Be it known that I, SUSANNA N. NUTZ, a citizen of the United States, residing at Kansas City, in the county of Jackson and State of Missouri, have invented certain new and useful Improvements in Adjustable Measuring and Ruling Devices, of which the following is a specification.

My invention relates to improvements in adjustable measuring and ruling devices; and my object is to provide means whereby parallel lines extending at any desired angle may be readily marked upon cloth or paper preparatory to cutting the same on the bias.

The invention comprises a series of parallel rulers of equal length pivotally secured at their opposite terminals to two links, means whereby said rulers may be quickly and accurately adjusted to any desired angle, and means for locking said rulers after they have been adjusted to the angle desired.

In order that the invention may be readily understood, reference will now be made to the accompanying drawings, in which—

Figure 1 represents a plan view of the device, showing it folded in dotted lines. Fig. 2 is a broken section taken on line II II of Fig. 1, showing the arrangement of one of the joints between the parallel rulers and the links. Fig. 3 is a section of one of the parallel rulers and means for determining the angle at which the rulers are arranged.

In said drawings, 1, $1^a$ and $1^b$ designate a series of parallel rulers pivotally secured at their opposite ends to links 2 and 3 by means of tubular rivets 4, the interior diameters of which are large enough to admit a pencil-point. The opposite ends 5 of the rulers are scarfed and underlap scarfed portions 6 of the links in order that the under side of the device will lie flatly against the material upon which it is placed, and thus prevent said material from wrinkling while being marked or cut. A pin 7, rigidly secured at its lower end to ruler $1^b$ at the right side of the device, is substituted for one of rivets 4 and extends upwardly through the center of a graduated segment 8, formed integral with the right end of link 3.

9 designates a pointer rigidly secured at one end to the upper end of pin 7 and having its opposite end arranged vertically above the graduations on segment 8. Pointer 9 is arranged in alinement with ruler $1^b$, so that the device may be quickly and accurately adjusted to the desired angle by swinging the pointer to the proper place on the graduated segment.

A screw 10 extends upwardly through ruler $1^a$ at the left side of the device and through the left end of link 3 and is provided with a thumb-nut 11, whereby all of the rulers are locked at any desired angle. Link 3 is provided with an aperture $3^a$, located midway between screw 10 and the nearest rivet.

In practice the rulers are preferably made of strips one inch in width and so spaced that when arranged at an angle of forty-five degrees, as shown in Fig. 1, the spaces between said rulers will each equal one inch. Consequently when the device is placed upon a piece of cloth the latter can be quickly divided into one-inch strips by drawing a marker or a cutter along the sides of said rulers. If two-inch strips of cloth are desired, the cutter will be drawn along but one side of each ruler, and if three-inch or wider strips are required the proper number of sides will be skipped with the cutter. If strips but one-half inch in width are needed, the cloth will first be divided into inches by drawing a marker along the sides of the rulers. A dot is then made upon the cloth by passing a pencil through aperture $3^a$, after which the device is moved downwardly and to the right until the front side of ruler $1^a$ registers with said dot. This brings the sides of the rulers midway between the lines drawn upon the cloth, so that other lines subdividing the inch strips into one-half-inch strips may be drawn.

A piece of cloth may be quickly divided into diamond-shaped figures for quilting by drawing lines thereon with the rulers arranged at the angle shown in Fig. 1 and then changing the position of said rulers so that other lines may be drawn at the proper angle to intersect the first-mentioned lines.

From the above description it is apparent that I have produced a device whereby cloth or paper may be readily divided into bias pieces of any suitable width and extending at any angle desired.

Having thus described my invention, what I claim, and desire to secure by Letters Patent, is—

A device of the character described comprising a series of parallel rulers scarfed at their opposite ends, links scarfed at their under sides, tubular rivets pivotally connecting a number of the scarfed ends of the rulers to the scarfed under sides of said links, a screw pivotally connecting the ends of one of said rulers and links, a thumb-nut adjustably engaging the upper end of said screw, a graduated segment formed integral with one end of one of said links, a pin rigidly secured to the end of one of said rulers and extending upwardly through the central portion of the segment, and a pointer rigidly secured to the upper end of said pin.

In testimony whereof I affix my signature in the presence of two witnesses.

SUSANNA N. NUTZ.

Witnesses:
  F. G. FISCHER,
  LESLIE E. BAIRD.